(12) United States Patent
Okazawa et al.

(10) Patent No.: US 9,264,562 B2
(45) Date of Patent: Feb. 16, 2016

(54) RECORDING APPARATUS

(71) Applicant: SEIKO EPSON CORPORATION, Tokyo (JP)

(72) Inventors: Yoshiyuki Okazawa, Shiojiri (JP); Hidetake Nishizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/447,124

(22) Filed: Jul. 30, 2014

(65) Prior Publication Data

US 2015/0077815 A1 Mar. 19, 2015

(30) Foreign Application Priority Data

Sep. 17, 2013 (JP) ................... 2013-191919
Sep. 17, 2013 (JP) ................... 2013-191946

(51) Int. Cl.
*H04N 1/04* (2006.01)
*H04N 1/00* (2006.01)

(52) U.S. Cl.
CPC ................. *H04N 1/00551* (2013.01)

(58) Field of Classification Search
CPC .............................. H04N 1/00551

USPC .......... 358/498, 496, 497, 474, 450; 399/379, 399/380

See application file for complete search history.

(56) References Cited

U.S. PATENT DOCUMENTS

| 9,118,830 | B2 * | 8/2015 | Okazawa ............. H04N 1/2323 |
| 2007/0223060 | A1 * | 9/2007 | Ikeno et al. ................... 358/497 |
| 2010/0091315 | A1 * | 4/2010 | Shiraki ........................ 358/1.13 |
| 2010/0296130 | A1 * | 11/2010 | Lee et al. ....................... 358/450 |
| 2013/0063751 | A1 | 3/2013 | Miura et al. |

FOREIGN PATENT DOCUMENTS

JP 2013-058980 3/2013

* cited by examiner

*Primary Examiner* — Cheukfan Lee
(74) *Attorney, Agent, or Firm* — Workman Nydegger

(57) ABSTRACT

A printer includes a scanner unit which reads a document; and a recording portion which records information read by the scanner unit. In the recording portion, the maximum recordable size of a paper sheet is greater than a size of a document reading area in the scanner unit. At a base end side of a cover, which opens and closes the document reading area, a gap is formed which passes the document to an outer side of the scanner unit when the document is pushed out from the document reading area.

20 Claims, 17 Drawing Sheets

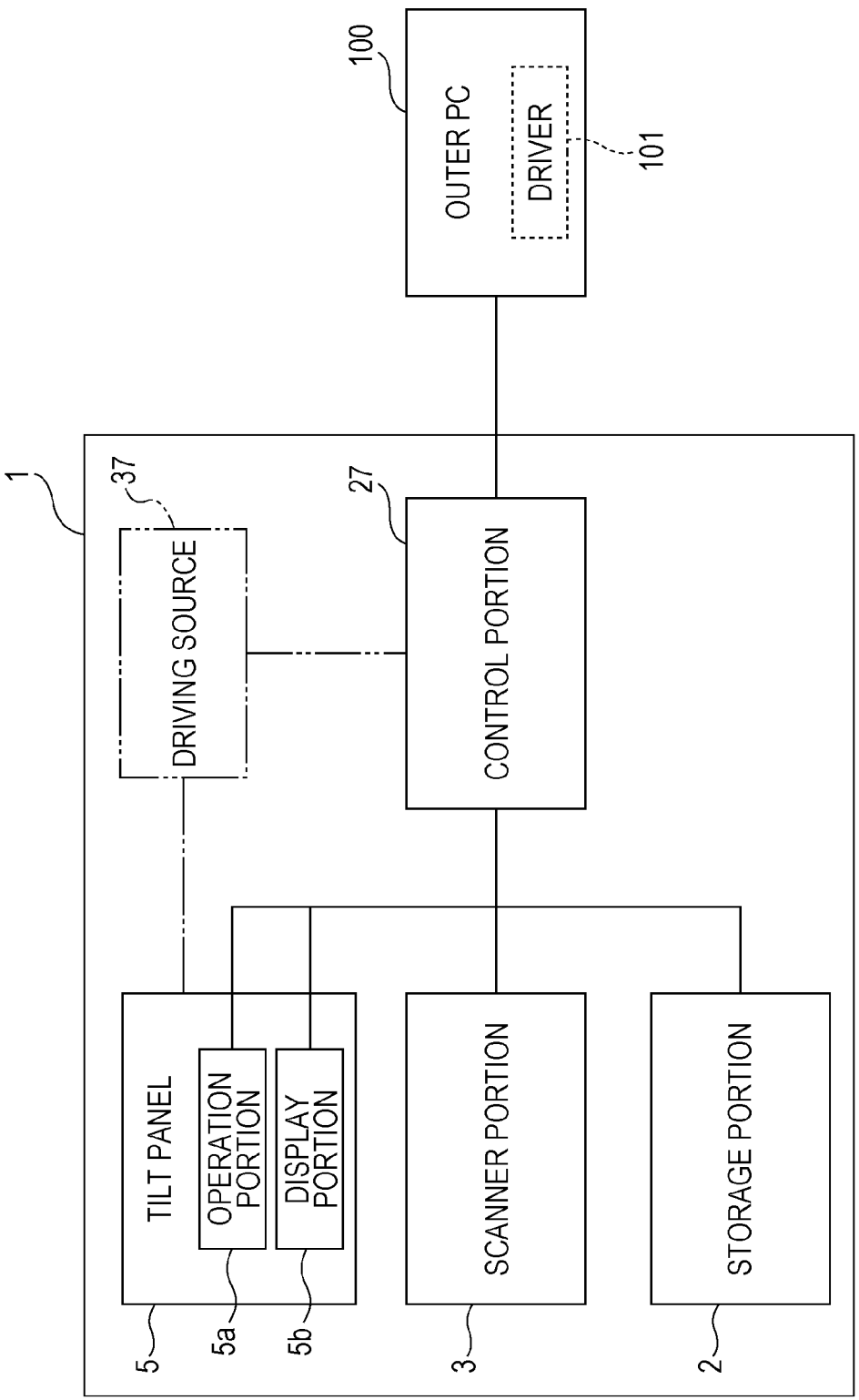

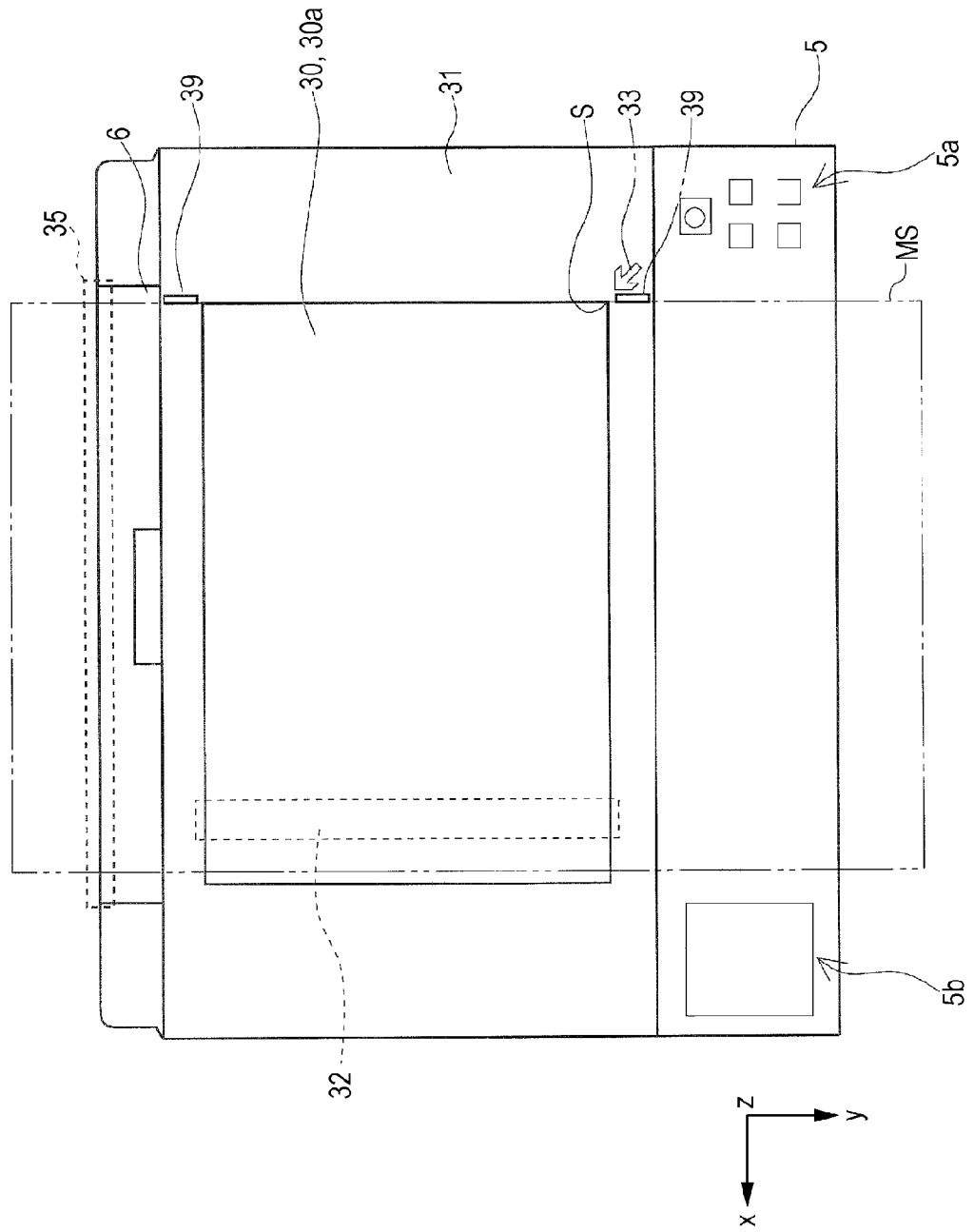

RECORDING APPARATUS

BACKGROUND

1. Technical Field

The present invention relates to a recording apparatus which is represented by a facsimile or a printer, and particularly, relates to a recording apparatus which is provided with both a scanner function and a recording function.

2. Related Art

Among recording apparatuses which are represented by a facsimile or a printer, further, in the recording apparatus which performs recording on a recording medium by discharging ink, there is a recording apparatus which is called a multifunction printer or the like provided with both a scanner function and a recording function. Many multifunction printers include a flatbed-shaped scanner portion, for example, on an upper portion of a main body (recording portion) of the apparatus which performs ink jet recording.

A multifunction printer illustrated in JP-A-2013-58980 is also an example thereof. The multifunction printer has a technical problem to be solved in that, when a copy operation of a document which is larger than the maximum readable size of the scanner portion occurs, the document which is pushed out from the scanner portion and droops down covers a sheet ejected from the recording portion, and a user has difficulty in confirming an image recorded on the sheet. The multifunction printer of JP-A-2013-58980 for solving the problem shifts a paper sheet ejection area with respect to a readable area of the scanner portion.

However, when the above-described various large-sized documents (documents of which sizes are greater than a size of a document reading area) are read, a plurality of reading operations is performed (division reading), and the obtained images are linked with each other inside the recording apparatus (or in a connected outer computer). Accordingly, an image of the entire document can be obtained.

When a plurality of times of a document reading operation is performed in this manner, the user slides or rotates the document. When such a user operation is performed, in the multifunction printer in the above-described JP-A-2013-58980, a part pushed out from the document table in the document is drooped to an ejected paper tray. Accordingly, in order to prevent the document from slipping from the document table, it is required to press the document tightly. For this reason, it cannot be said that operability is excellent.

SUMMARY

An advantage of some aspects of the invention is to provide a recording apparatus having a scanner in which operability is excellent when a reading operation of a document of which the size is greater than that of a document reading area is performed.

APPLICATION EXAMPLE 1

There is provided a recording apparatus including: a scanner portion which reads a document mounted on a document table; and a recording portion which records information read by the scanner portion to a recording medium. In the recording portion, the maximum recordable size of the recording medium is greater than the size of the document reading area which reads the document on the document table. The scanner portion includes: a cover which opens and closes the document reading area; and a hinge portion which can rotate the cover. The hinge portions, in a direction perpendicular to a direction that brings the document reading area into contact with the cover, are outer sides of the document reading area, and are provided on both sides with respect to the document reading area. At a base end side of the cover, a gap which passes the document, which is pushed out from the document reading area and of which the size is greater than the size of the document reading area, to an outer side of the scanner portion, is provided.

According to the configuration, in the recording apparatus provided with the scanner portion and the recording portion, since there is provided a gap at a base end side of the cover which opens and closes the document reading area, which passes the document, which is pushed out from the document reading area and of which the size is greater than that of the document reading area, to the outer side of the scanner portion, it is possible to fold the document when the large-sized document is read, and to avoid an inconvenient operation, such as rotating the document at the time of the division reading, and thus the operability is improved.

APPLICATION EXAMPLE 2

In the recording apparatus, the gap may be formed both in a state where the cover is opened and a state where the cover is closed.

According to the configuration, since the gap is formed both in the state where the cover is opened and the state where the cover is closed, it is possible to suppress light incorporated from the outside by closing the cover at the time of the reading, and to obtain an excellent reading result.

APPLICATION EXAMPLE 3

In the recording apparatus, in a direction perpendicular to a direction that brings the document reading area into contact with the gap, the gap may be formed so as to include the entire document reading area.

According to the configuration, in the direction perpendicular to the direction that brings the document reading area into contact with the gap, since the gap is formed so as to include the entire document reading area, it is possible to pass the part pushed out from the document reading area of more sizes of documents to the outer side of the scanner portion.

APPLICATION EXAMPLE 4

The recording apparatus may further include a recording medium supply port which is positioned between the document reading area and the gap for supplying the recording medium into the recording portion; and an opening/closing body which opens and closes the recording medium supply port. In a state where the opening/closing body is closed, the opening/closing body may support the document pushed out from the document reading area.

According to the configuration, since the opening/closing body, which opens and closes the recording medium supply port for supplying the recording medium into the recording portion, supports the document pushed out from the document reading area, it is possible to support the document in the higher position than the opening/closing body and to suppress the slipping and the drooping of the document from the document table.

APPLICATION EXAMPLE 5

In a recording apparatus, a supporting position at which the opening/closing body supports the document is higher than the document table.

According to the configuration, since the supporting position at which the opening/closing body supports the document is higher than the document table, it is possible to support the document at a higher position, and to suppress the slipping or the drooping of the document from the document table with certainty.

APPLICATION EXAMPLE 6

In the recording apparatus, the cover has a notch which avoids the opening/closing body in a closed state at the time of the rotation. When the cover is opened and the opening/closing body is closed, the gap may be formed between the notch and the opening/closing body.

According to the configuration, since the cover has the notch which avoids the opening/closing body in a closed state at the time of the rotation, and when the cover is opened and the opening/closing body is closed, the gap is formed between the notch and the opening/closing body, as the notch which avoids the opening/closing body forms the gap, it is possible to configure the gap at a low cost.

APPLICATION EXAMPLE 7

The recording apparatus may further include a panel, which constitutes the scanner portion and an operation portion of the recording portion at a side opposite to a side where the gap is provided by interposing the document reading area. The panel may support the document which is pushed out from the document reading area.

According to the configuration, since the panel constitutes the scanner portion and the operation portion of the recording portion, and the panel supports the document which is pushed out from the document reading area, it is possible to obtain an effect of suppressing the drooping or the slipping of the document from the document table.

APPLICATION EXAMPLE 8

In the recording apparatus, a supporting position at which the panel supports the document may be higher than the document table.

According to the configuration, since the supporting position at which the panel supports the document is higher than the document table, it is possible to suppress the slipping or the drooping of the document from the document table with certainty.

APPLICATION EXAMPLE 9

In the recording apparatus, the supporting surface which supports the document may be a substantially horizontal surface in the panel.

According to the configuration, since the supporting surface which supports the document has the substantially horizontal surface in the panel, it is possible to more effectively suppress the slipping or the drooping of the document from the document table.

APPLICATION EXAMPLE 10

In the recording apparatus, a guide portion, which guides an edge of the document when the document slides along a direction that brings the document reading area into contact with the gap, may be provided at an outer side of the document reading area.

According to the configuration, since the guide portion which guides the edge of the document when the document slides along the direction that brings the document reading area into contact with the gap, is provided at the outer side of the document reading area, when the document of which the size is greater than that of the document reading area is divided and read (when the document slides), it is possible to suppress a deviation of an oblique motion of the document, and to obtain an excellent reading result.

APPLICATION EXAMPLE 11

There is provided a recording apparatus including: a scanner portion which reads a document mounted on a document table; a recording portion which records information read by the scanner portion to a recording medium; and a panel which constitutes the scanner portion and an operation portion of the recording portion. In the recording portion, the maximum recordable size of the recording medium is greater than the size of a document reading area which reads the document on the document table, and the panel supports the document pushed out from the document reading area on the document table.

According to the configuration, in the recording apparatus provided with the scanner portion and the recording portion, since the panel, which constitutes the scanner portion and the recording portion, supports the document pushed out from the document reading area, it is possible to suppress the drooping or the slipping of the document from the document table, and to improve the operability at the time of the document reading.

APPLICATION EXAMPLE 12

In the recording apparatus, a supporting position at which the panel supports the document may be higher than the document table.

According to the configuration, since the supporting position at which the panel supports the document is higher than the document table, it is possible to suppress the slipping or the drooping of the document from the document table with certainty.

APPLICATION EXAMPLE 13

In the recording apparatus, the panel may be provided to be tiltable.

According to the configuration, since the panel is tiltable, it is possible to consider a panel surface as an angle which has excellent operability and visibility, and thus the operability and the user experience is improved.

APPLICATION EXAMPLE 14

In the recording apparatus, a supporting surface, which supports the document in the panel in a state where the panel is opened, may be a substantially horizontal surface.

According to the configuration, since the supporting surface, which supports the document in the panel, is a substantially horizontal surface, it is possible to more effectively suppress the slipping or the drooping of the document from the document table.

APPLICATION EXAMPLE 15

The recording apparatus may further include: a driving source which tilts the panel; and a control portion which controls the driving source and the scanner portion. The control portion may control the driving source so that a supporting surface that supports the document on the panel is a substantially horizontal surface at the time of the document reading by the scanner portion.

According to the configuration, since the driving source is controlled so that the supporting surface that supports the document on the panel is a substantially horizontal surface at the time of the document reading by the scanner portion, it is possible to more effectively suppress the slipping or the drooping of the document from the document table.

APPLICATION EXAMPLE 16

In the recording apparatus, the panel may be formed at a width including the entire document reading area, in a direction perpendicular to a direction that brings the document reading area into contact with the panel.

According to the configuration, since the panel is formed at a width including the entire document reading area, in a direction perpendicular to a direction that brings the document reading area into contact with the panel, the entire width direction of the document pushed out from the document reading area is supported by the panel. Accordingly, it is possible to more effectively suppress the slipping or the drooping of the document from the document table.

APPLICATION EXAMPLE 17

The recording apparatus may further include: a recording medium supply port which is provided on a side opposite to a side where the panel is provided by interposing the document reading area, for supplying the recording medium into the recording portion; and an opening/closing body which opens and closes the recording medium supply port. The opening/closing body may support the document pushed out from the document reading area in a state where the opening/closing body is closed.

According to the configuration, since the opening/closing body, which opens and closes the recording medium supply port for supplying the recording medium into the recording portion, supports the document pushed out from the document reading area, it is possible to support the document at a higher position by the opening/closing body, and to suppress the slipping or the drooping of the document from the document table.

APPLICATION EXAMPLE 18

In the recording apparatus, a supporting position at which the opening/closing body supports the document may be higher than the document table.

According to the configuration, since the supporting position at which the opening/closing body supports the document is higher than the document table, it is possible to support the document at a higher position, and to suppress the slipping or the drooping of the document from the document table with certainty.

APPLICATION EXAMPLE 19

In the recording apparatus, a guide portion which guides an edge of the document when the document slides along the direction that brings the document reading area into contact with the panel, may be provided at an outer side of the document reading area.

According to the configuration, since the guide portion, which guides the edge of the document when the document slides along the direction that brings the document reading area into contact with the gap, is provided at the outer side of the document reading area, when the document of which the size is greater than that of the document reading area is divided and read (when the document slides), it is possible to suppress the deviation of the oblique motion of the document, and to obtain the excellent reading result.

BRIEF DESCRIPTION OF THE DRAWINGS

The invention will be described with reference to the accompanying drawings, wherein like numbers reference like elements.

FIG. 11 is a block diagram of a control system of the printer according to the invention.

FIG. 17 is a plan view of a scanner unit according to another embodiment.

DESCRIPTION OF EXEMPLARY EMBODIMENTS

Hereinafter, an embodiment of the invention will be described based on the drawings. The invention is not limited to the embodiment described below, and various modifications are possible within the scope of the invention mentioned in the scope of the claims. On the assumption that the claims are included in the scope of the invention, an embodiment of the invention will be described below.

Figure 1:
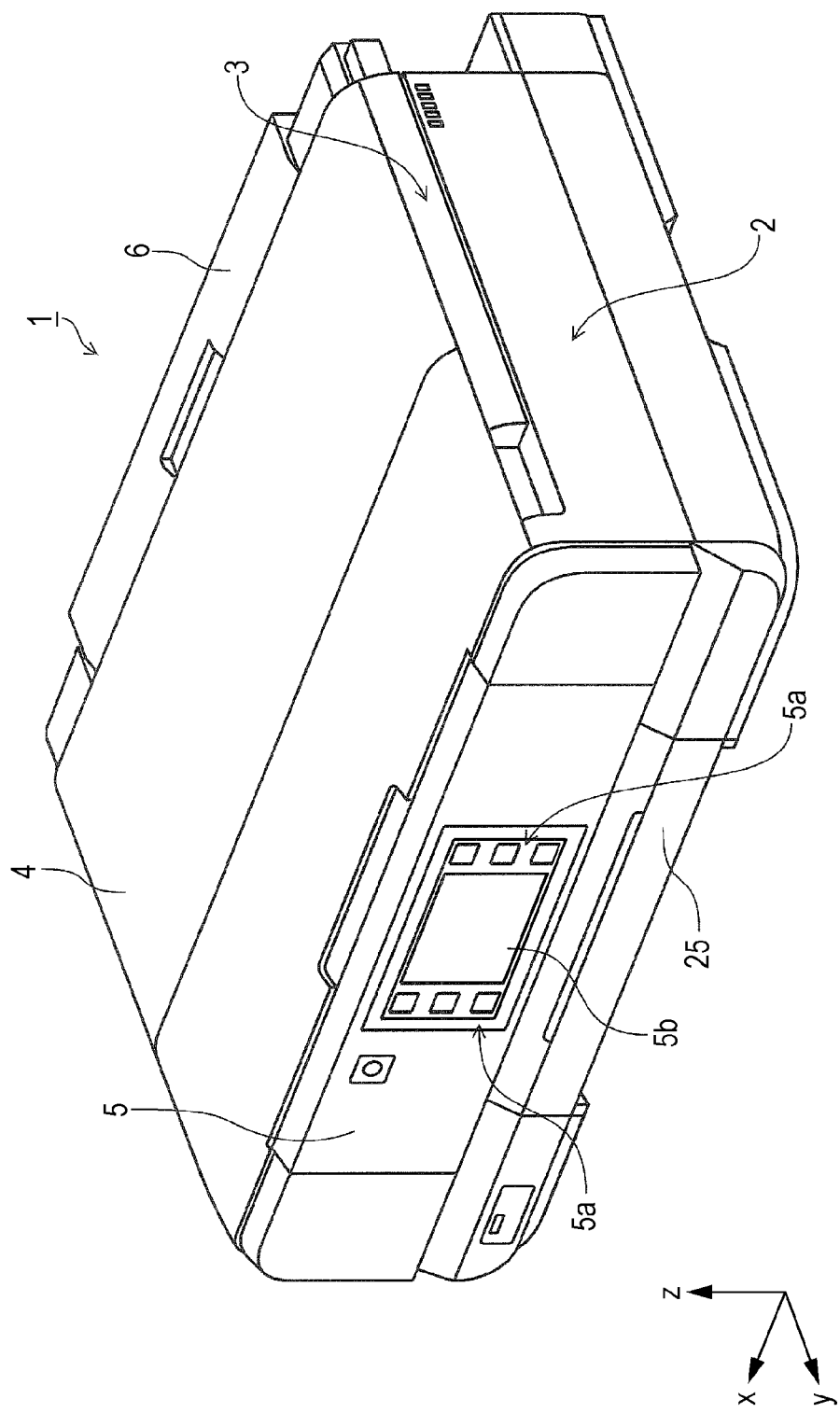
FIG. 1 is an outer appearance perspective view when a printer is viewed from a front side according to the invention.
Figure 2:
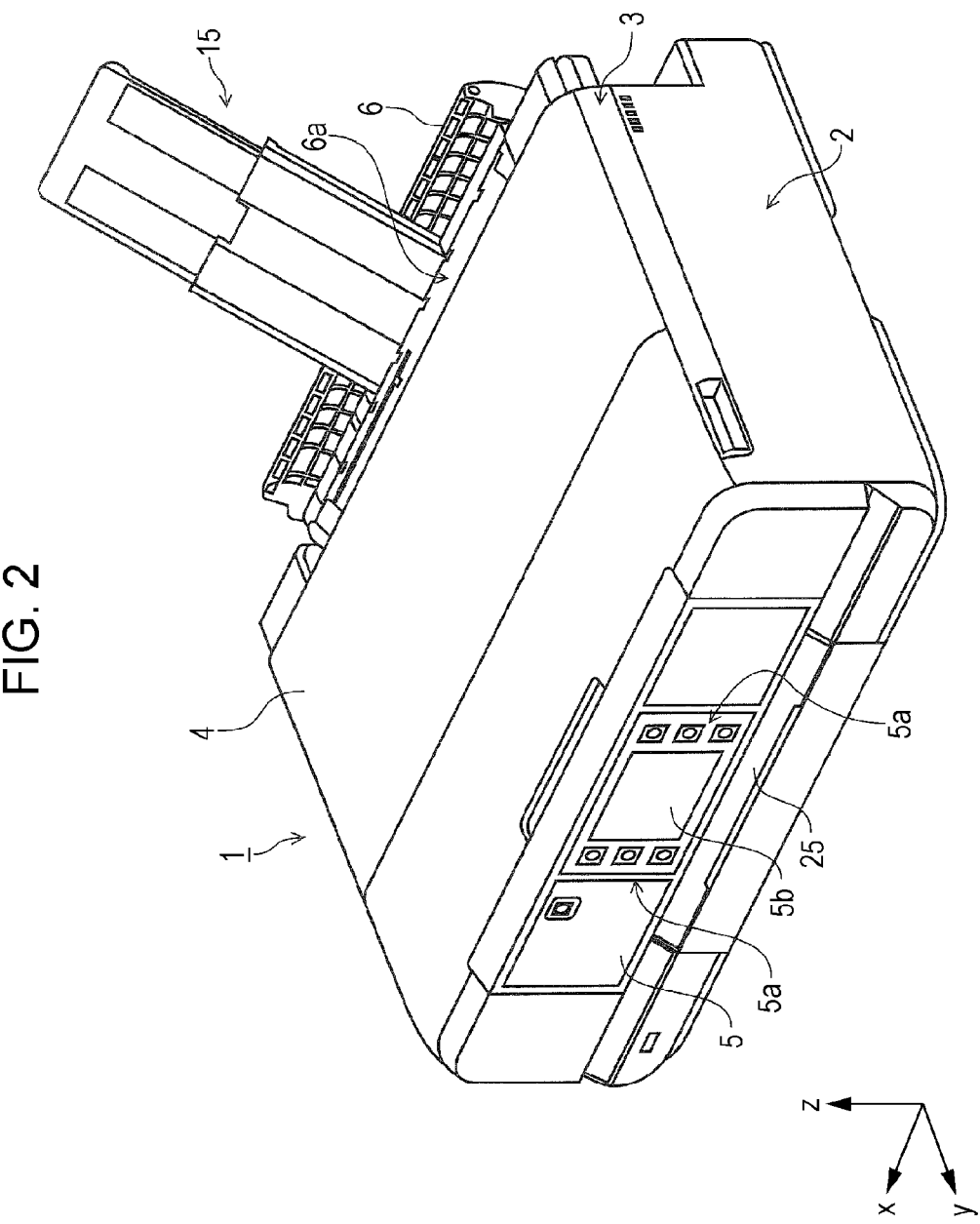
FIG. 2 is an outer appearance perspective view when the printer is viewed from the front side according to the invention.
Figure 3:
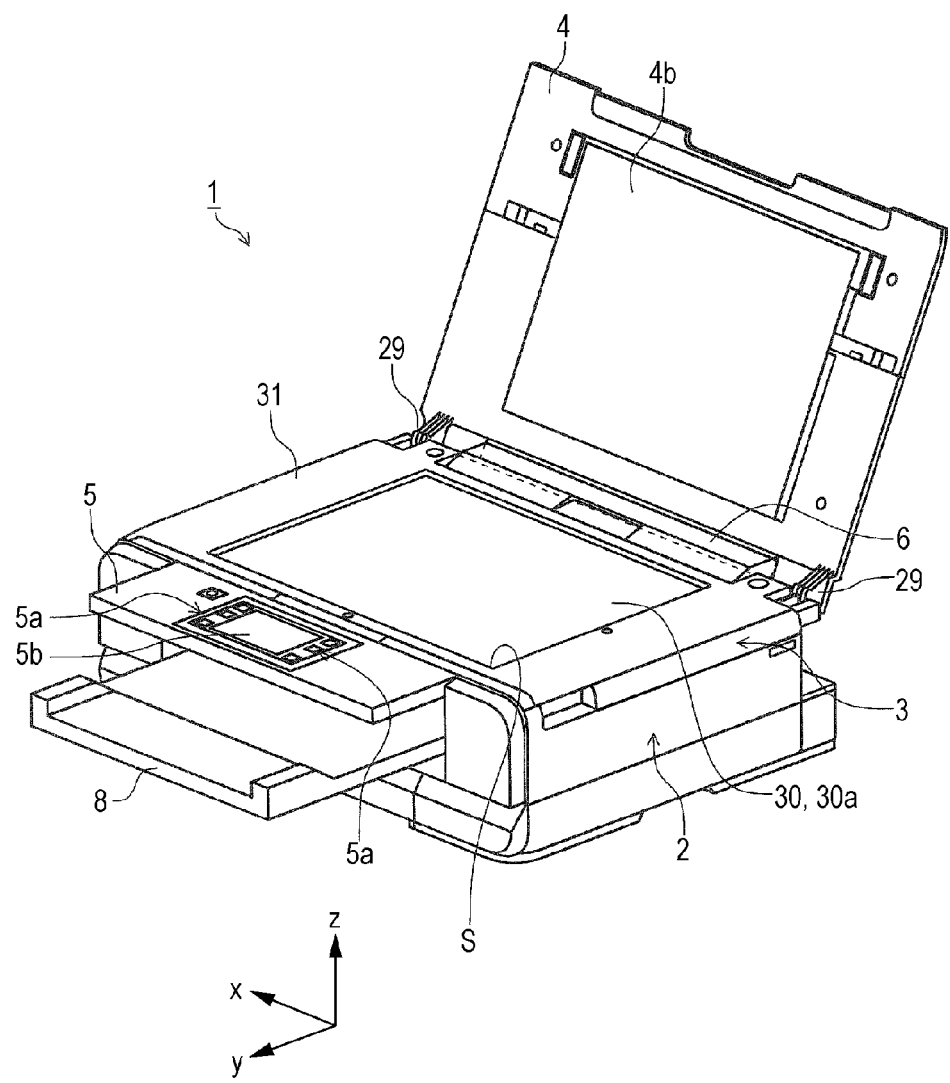
FIG. 3 is an outer appearance perspective view when the printer is viewed from the front side according to the invention.

FIGS. 1, 2, and 3 are outer appearance perspective views when a printer 1 is viewed from a front side according to the invention. FIG. 1 is a view illustrating a state where a cover 4 of a scanner unit 3 is closed. FIG. 2 is a view illustrating a state where a manual feeding cover 6 is opened and a paper support 15 is unfolded. FIG. 3 is a view illustrating a state where the cover 4 of the scanner unit 3 and a tilt panel 5 are opened and an ejected paper receiving tray 8 is protruded.

Figure 4:
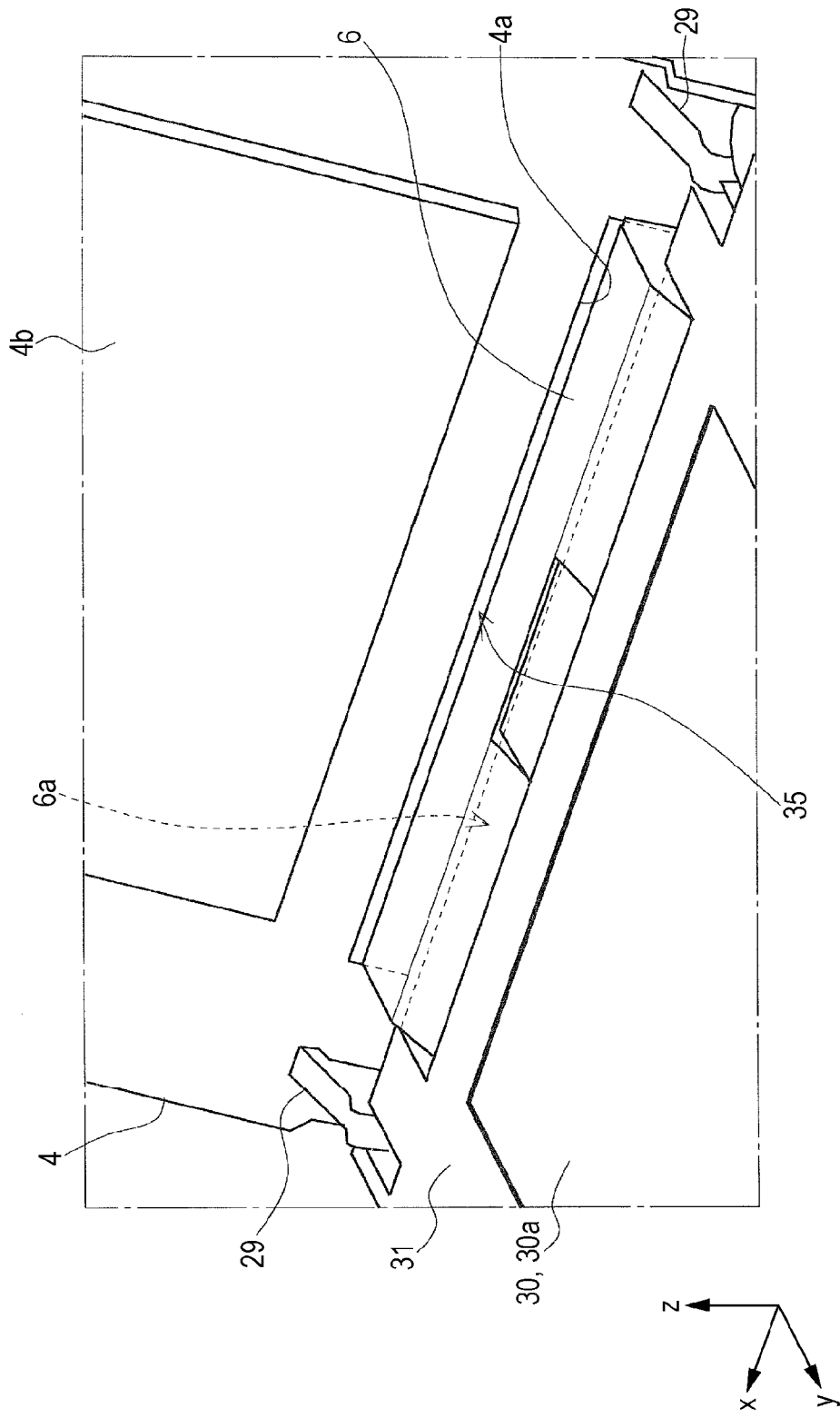
FIG. 4 is a partially enlarged view of FIG. 3.
Figure 5:
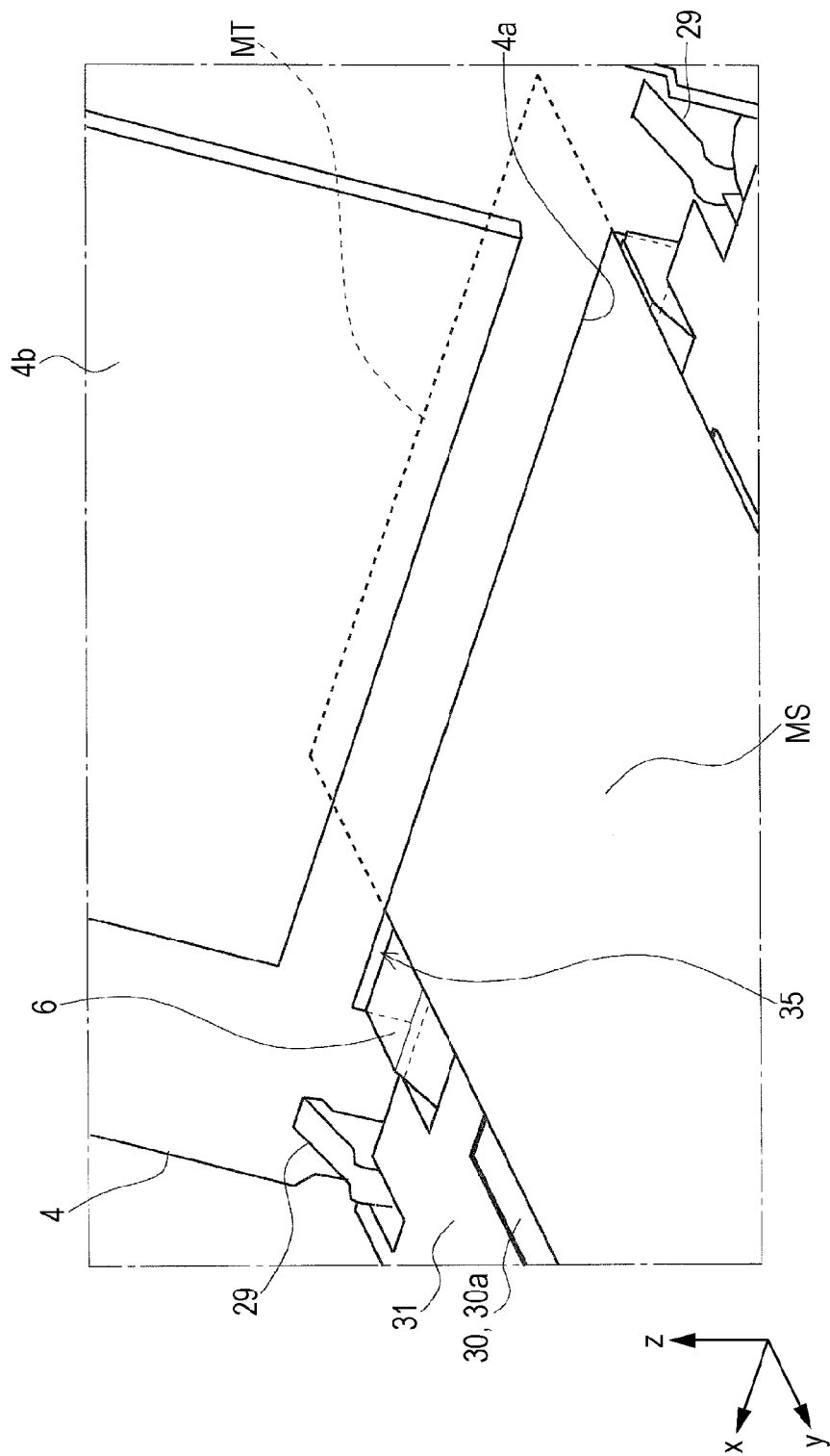
FIG. 5 is a view in a state where a document passes through a gap in FIG. 4.
Figure 6:
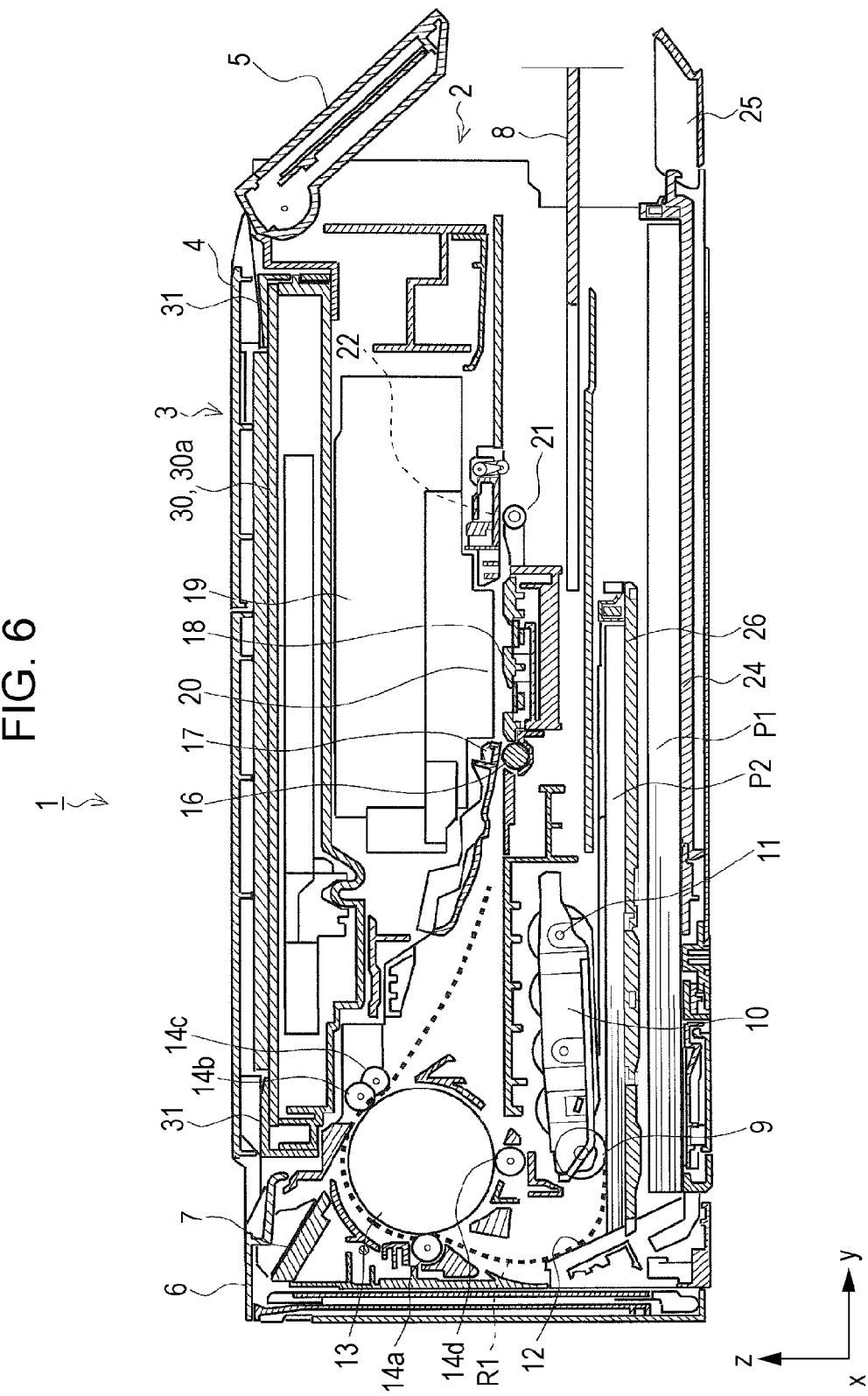
FIG. 6 is a side cross-sectional view illustrating a paper transporting path of the printer according to the invention.
Figure 7:
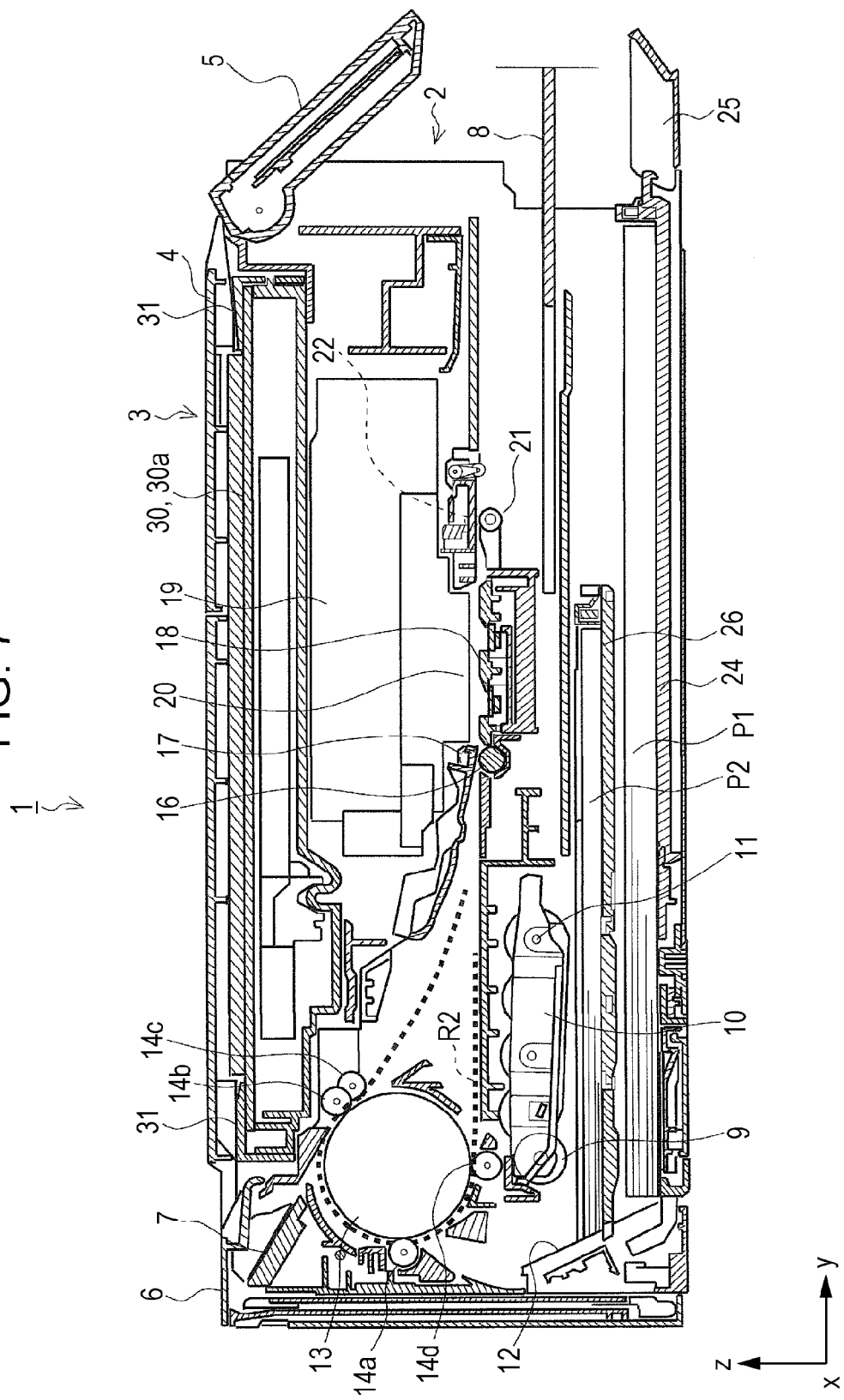
FIG. 7 is a side cross-sectional view illustrating the paper transporting path of the printer according to the invention.
Figure 8:
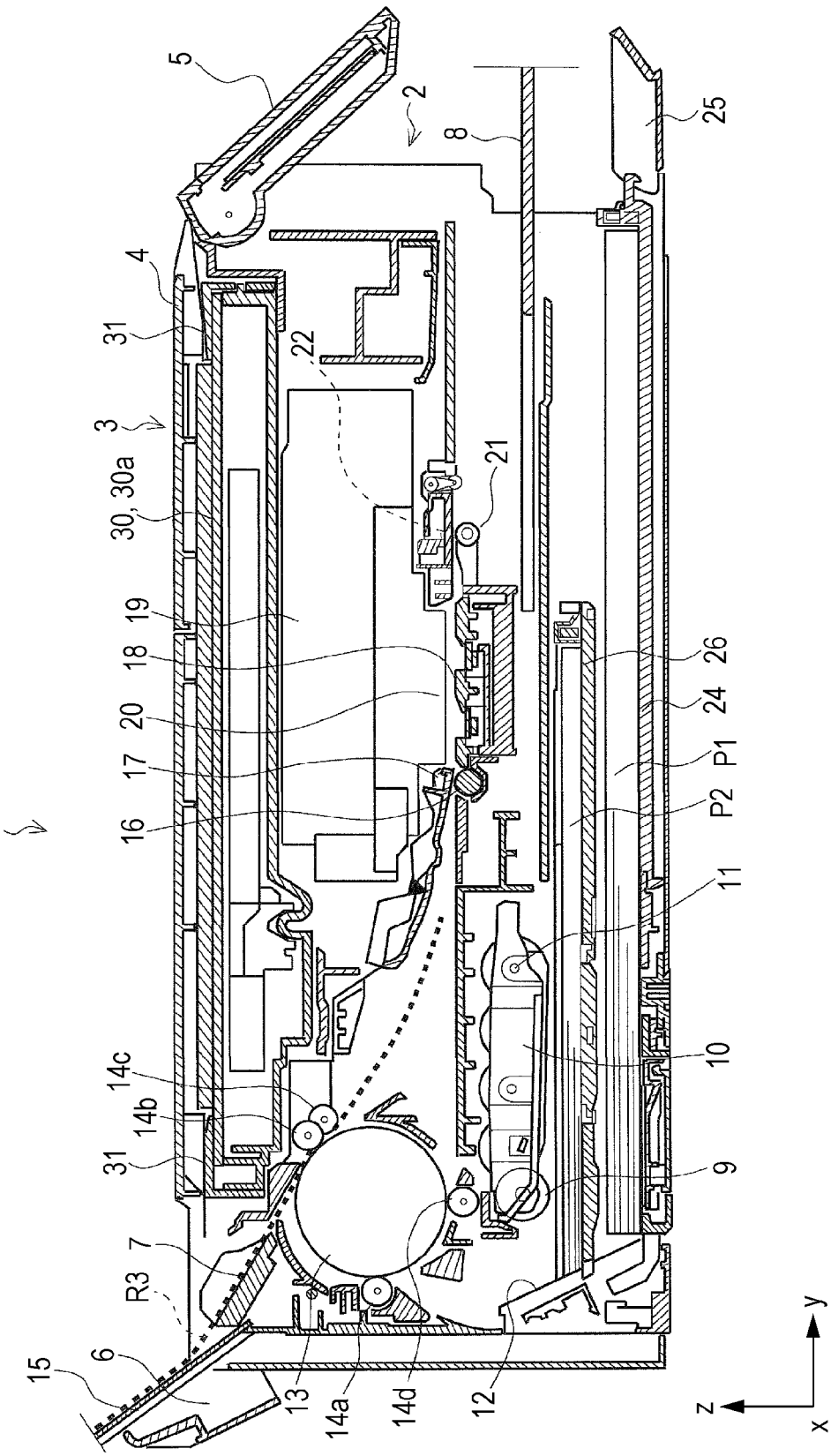
FIG. 8 is a side cross-sectional view illustrating the paper transporting path of the printer according to the invention.

In addition, FIG. 4 is a partially enlarged view of FIG. 3. FIG. 5 is a view of a state where a document passes through a gap 35 in FIG. 4. FIGS. 6 to 8 are side cross-sectional views illustrating a paper transporting path of the printer 1.

Figure 9:
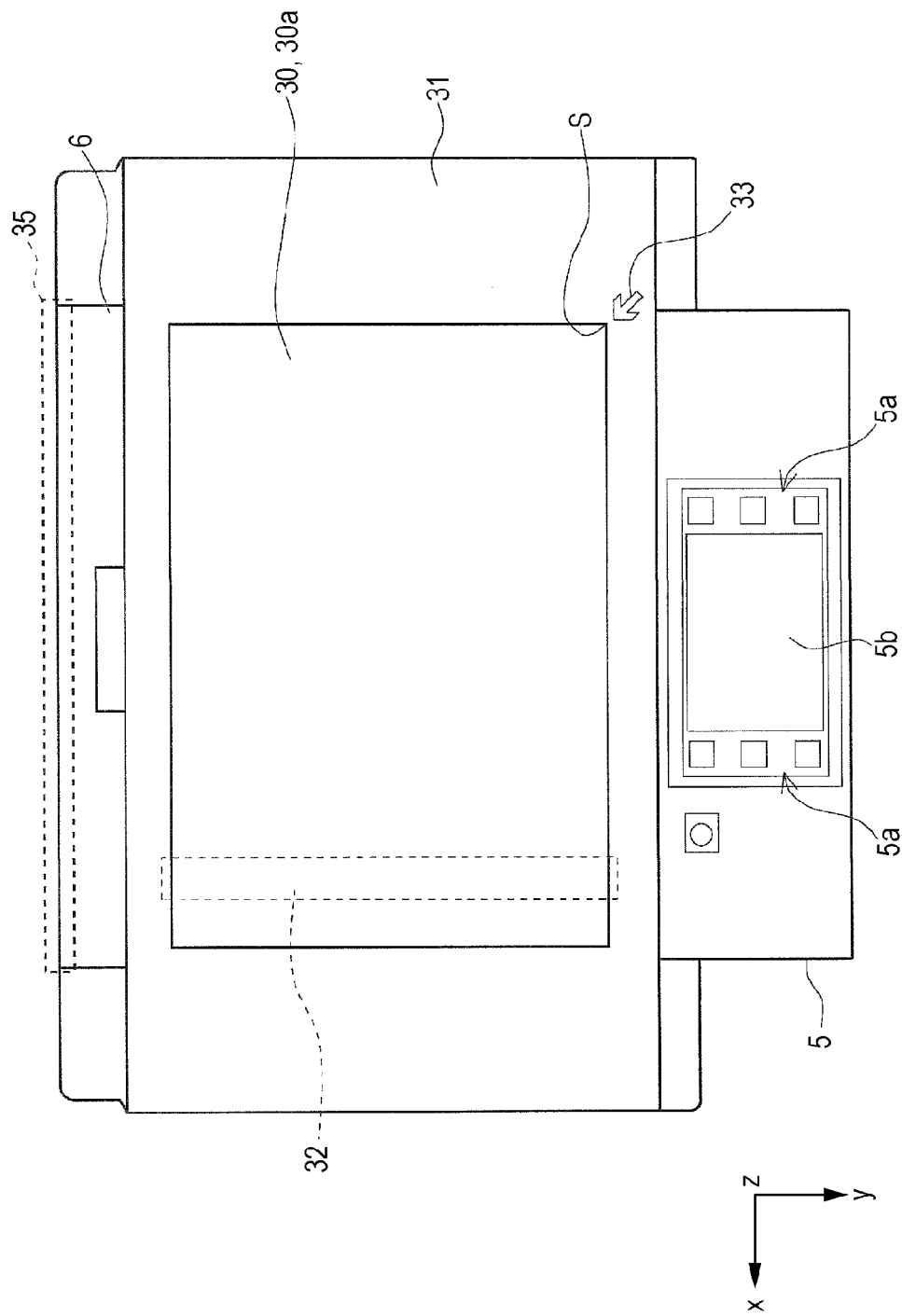
FIG. 9 is a plan view of a scanner unit.
Figure 10:
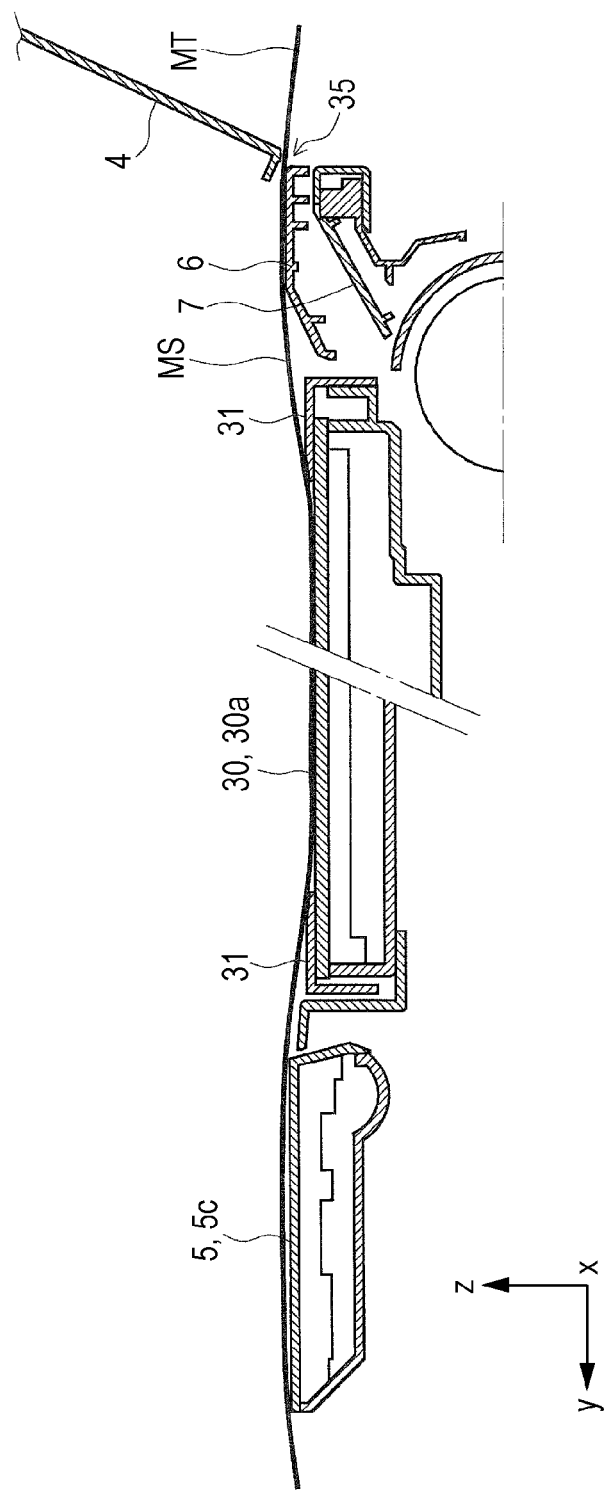
FIG. 10 is a side cross-sectional view of the scanner unit.
Figure 12A:
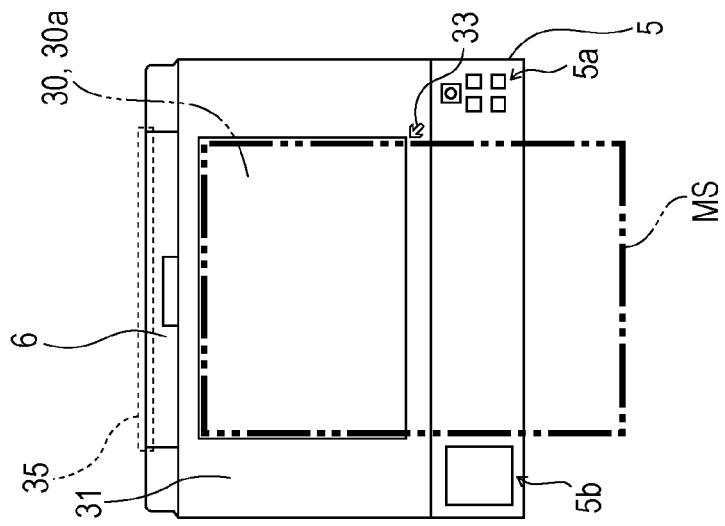
FIGS. 12A, 12B, and 12C are views illustrating a position of the document when a division reading mode is executed.
Figure 12B:
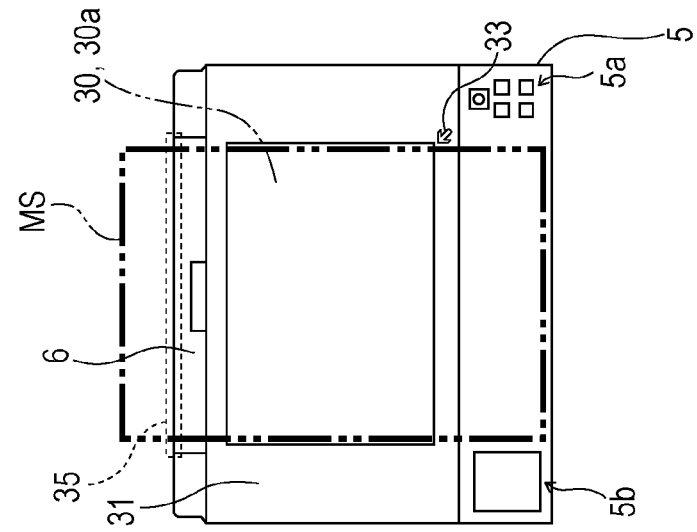
Figure 12C:
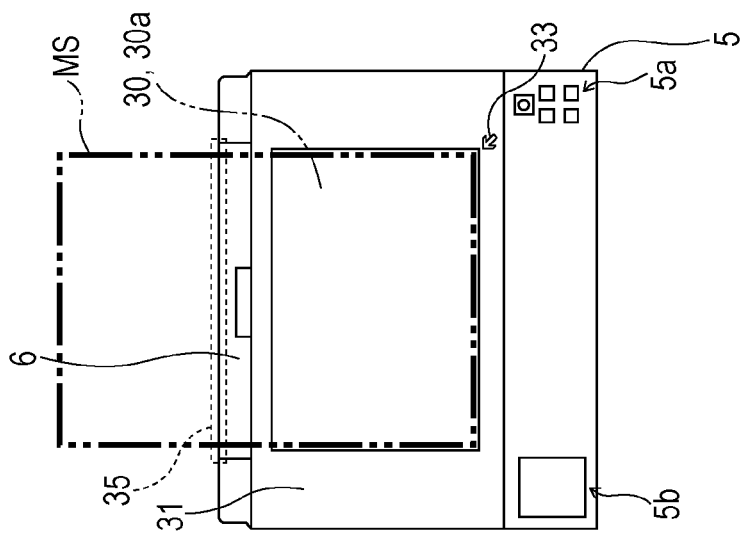
Figure 13:
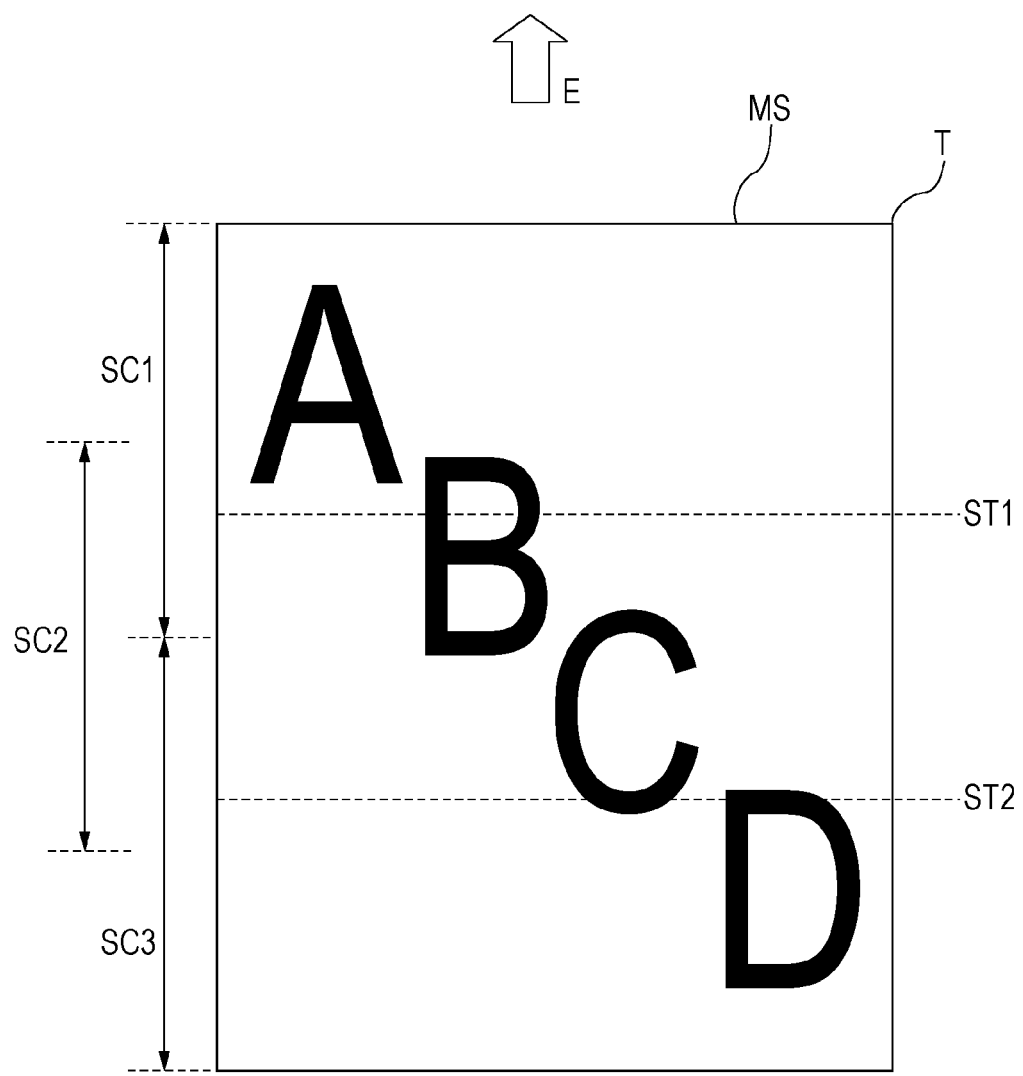
FIG. 13 is a view illustrating a position linking with a reading range when the division reading mode is executed.
Figure 14:
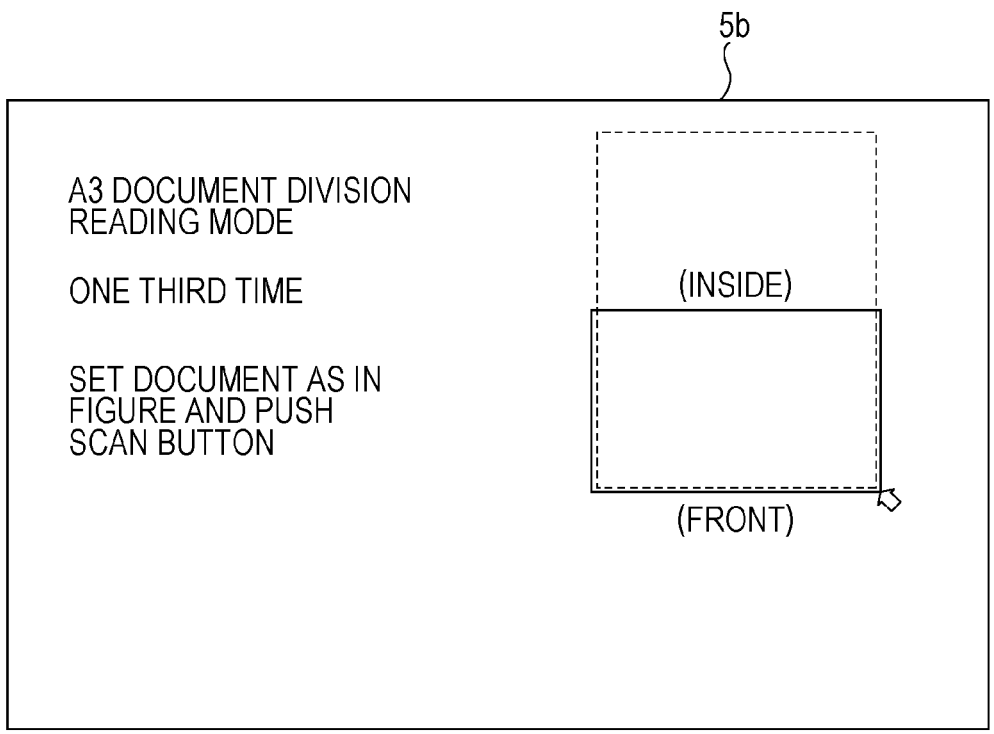
FIG. 14 is a view illustrating an example of a guidance screen when the division reading mode is executed.
Figure 15:
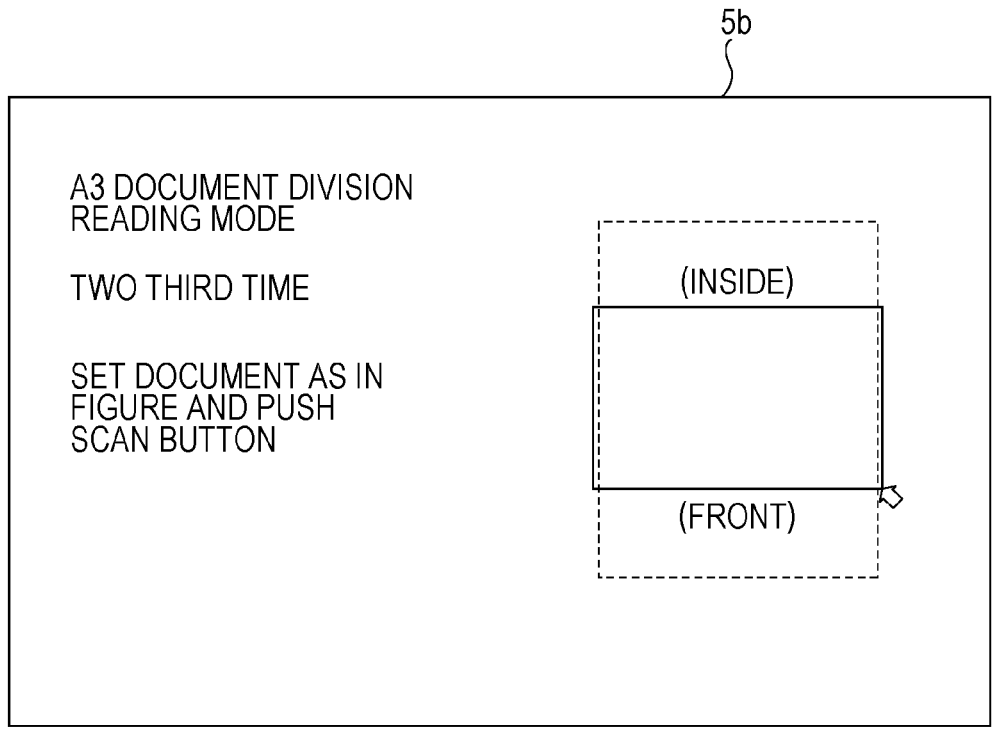
FIG. 15 is a view illustrating an example of the guidance screen when the division reading mode is executed.
Figure 16:
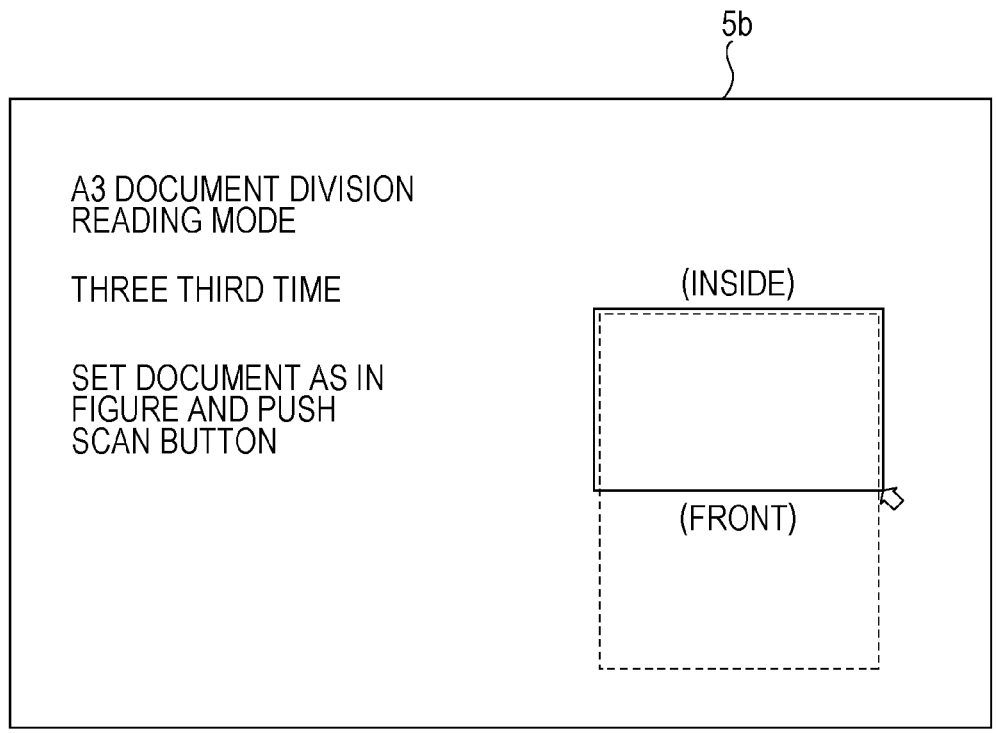
FIG. 16 is a view illustrating an example of the guidance screen when the division reading mode is executed.

Furthermore, FIG. 9 is a plan view of the scanner unit 3. FIG. 10 is a side cross-sectional view of the scanner unit 3. FIG. 11 is a block diagram of a control system of the printer 1. FIGS. 12A, 12B, and 12C are views illustrating a position of the document when the division reading mode is executed. FIG. 13 is a view illustrating a position linking with a reading range when the division reading mode is executed. FIGS. 14 to 16 are views illustrating an example of a guidance screen when the division reading mode is executed. In addition, FIG. 17 is a plan view of a scanner unit according to another embodiment.

Furthermore, in an x-y-z rectangular coordinate system illustrated in each drawing, an x direction and a y direction are horizontal directions. Here, the x direction is a paper width direction in a recording portion 2, or an apparatus right and left direction. In addition, the y direction is a paper transporting direction in the recording portion 2, or an apparatus depth direction. Furthermore, a z direction is a gravity direction, and may be an apparatus height direction. Definitions of each direction in the scanner unit 3 will be described later.

1. Overall Configuration of Printer

Hereinafter, first, an overall configuration of the printer 1 which is an embodiment of the recording apparatus the invention will be described. The printer 1 in FIGS. 1 to 3 is provided with the scanner unit 3 as a scanner portion on an upper portion of the recording portion (apparatus main body) 2 which performs ink jet recording on a recording paper sheet (hereinafter, referred to as "paper sheet P") as an example of a recording medium. In other words, the printer 1 is configured as a multifunction printer provided with a scanner function in addition to an ink jet recording function.

The scanner unit 3 is provided to be rotatable via a rotating shaft (not illustrated) with respect to the recording portion 2. By rotating, the scanner unit 3 obtains a closed state (FIG. 1) and an opened state (not illustrated). When the scanner unit 3 is opened, the inside of the recording portion 2 is exposed, and it is possible to perform an ink cartridge (not illustrated) switching operation or a paper jam processing operation.

The cover 4 of the upper portion in the scanner unit 3 is a cover which can be opened and closed. By releasing the cover 4, a document table 30 of the scanner unit 3 appears.

The reference numeral 5 in an apparatus front surface is a tilt panel which has: an operation portion 5a including a power source button or an operation button that performs various printing setting and a recording execution; and a display portion 5b that performs a preview display of a printing setting content or a printing image, various guidance displays, or the like. The tilt panel 5 is tiltable, is provided to be tiltable between a state where a panel surface is substantially vertical (FIGS. 1 and 2) and a state where the panel surface is substantially horizontal (FIG. 3), and is provided to be able to maintain an angle at an arbitrary posture in a tiltable range.

The reference numeral 6 in a rear upper portion of the recording portion 2 is a manual feeding cover which can be opened and closed. By opening the manual feeding cover 6 as illustrated in FIG. 2, paper feeding is performed by manually feeding the paper sheet P which uses the manual feeding supply port 6a. In addition, when the manual feeding cover 6 is opened, the paper support 15 can be unfolded, and the paper sheet P supplied from the manual feeding supply port 6a is supported in a tilted posture by the paper support 15.

Next, hereinafter, with reference to FIGS. 6 to 8, a configuration of the recording portion 2, in particular, a paper transporting path will be further described in detail. The printer 1 according to the embodiment is provided with a lower stage side tray 24 and an upper stage side tray 26 in an apparatus bottom portion to be detachable, respectively, and transports the recording paper sheets from the lower stage side tray 24 or the upper stage side tray 26 one by one. Furthermore, the reference numeral of the paper sheet accommodated on the lower stage side tray 24 is P1, and the reference numeral of the paper sheet accommodated on the upper stage side tray 26 is P2, respectively. Hereinafter, in a case where it is not required to particularly distinguish the paper sheets, the paper sheet will be called "paper sheet P".

The reference numeral 25 is a cover which can be opened and closed, provided on the lower stage side tray 24. By opening the cover 25, the lower stage side tray 24 and the upper stage side tray 26 are exposed to the apparatus front surface side and are detachable.

A feeding roller 9, which is driven to be rotated by a driving motor (not illustrated), is provided in a roller supporting member 10 which oscillates around a rotating shaft 11. When the upper stage side tray 26 is at a retractable position (not illustrated), the feeding roller 9 is in contact with the highest paper sheet P1 accommodated on the lower stage side tray 24 and rotated, and accordingly, the paper sheet P1 at the highest position is sent out from the lower stage side tray 24.

In addition, when the upper stage side tray 26 is at a colliding position (FIGS. 6 to 8), the feeding roller 9 is in contact with the highest paper sheet P2 accommodated on the upper stage side tray 26 and rotated, and accordingly, the paper sheet P2 at the highest position is sent out from the upper stage side tray 26.

Next, a separation inclined surface 12 is provided at a position facing a tip end of the lower stage side tray 24 and the upper stage side tray 26 in the recording portion 2. The paper sheet P sent out from the lower stage side tray 24 or the upper stage side tray 26 moves forward to a downstream side while a tip end thereof is in contact with the separation inclined surface 12, accordingly, the separation between the highest paper sheet P to be fed and the second highest paper sheet P is performed.

At a tip of the separation inclined surface 12, an intermediate roller 13, which is driven to be rotated by a motor (not illustrated), is provided. The paper sheet P is curved and reversed by the intermediate roller 13, and moves toward the apparatus front side. Furthermore, the reference numerals 14a, 14b, 14c, and 14d are driven rollers which are rotatably driven. At least the paper sheet P is nipped by the driven rollers 14a and 14b and the intermediate roller 13, and sent to the downstream side.

Furthermore, the driven roller 14d is a driven roller which nips the paper sheet P switched back to an upstream side (left side in FIGS. 6 to 8) from a transport driving roller 16 for a duplex printing between the driven roller and the intermediate roller 13.

The tip of the intermediate roller 13 is provided with the transport driving roller 16 which is driven to be rotated by the motor (not illustrated) and a transport driven roller 17 which is rotated in a driven manner by being in contact with the transport driving roller 16. By the rollers, the paper sheet P is sent to a lower part of the recording head 20 which constitutes recording means.

Next, the recording head 20 which discharges ink is provided at a bottom portion of the carriage 19. The carriage 19 is driven to reciprocate in a main scanning direction (x direction: paper surface forward-and-rearward direction in FIGS. 6 to 8) by the motor (not illustrated).

At a position facing the recording head 20, a supporting member 18 is provided. By the supporting member 18, an interval between the paper sheet P and the recording head 20 is defined. At a downstream side of the supporting member 18, an ejecting driving roller 21 which is driven to be rotated by the motor (not illustrated) and an ejecting driven roller 22 which rotates in a driven manner by being in contact with the ejecting driving roller 21, are provided. The paper sheet P which performs the recording by the recording head 20 is ejected to the ejected paper receiving tray 8 by the rollers.

The ejected paper receiving tray 8 positioned on the upper portion of the upper stage side tray 26 is provided to have a state (FIGS. 1 and 2) of being accommodated in the recording portion 2 by the motor (not illustrated) and a state (FIG. 3 and FIGS. 6 to 8) of being protruded to the front side of the recording portion 2. As the ejected paper receiving tray 8 is in the state of being protruded to the front side of the recording portion 2, it is possible to receive the paper sheet P which is ejected after the recording is performed.

In the above, main components on the paper transporting path are described. However, in addition to the paper transporting path (dashed line R1 in FIG. 6) on which the paper sheet P sent out from the above-described lower stage side tray 24 or the upper stage side tray 26 is transported, the paper transporting path also includes a reversing and transporting path (dashed line R2 in FIG. 7) which reverses the paper sheet P on which the recording is performed on the first surface (primary surface) and a manual feeding supplying path (dashed line R3 in FIG. 8) which is manually supplied via a manual introduction portion 7.

The reversing and transporting path R2 is a transporting path which inversely drives the transport driving roller 16, transports the paper sheet to between the intermediate roller 13 and the driven roller 14d by considering a side which is a rear end of the paper sheet at the time of the recording as a tip, reverses the paper sheet by the intermediate roller 13, and sends the paper sheet to between the transport driving roller 16 and the transport driven roller 17 again.

The manual feeding supplying path R3 is a supplying path which is formed by the manual introduction portion 7 which appears by releasing the manual feeding cover 6 of the rear upper portion and the paper support 15 which supports the paper sheet P manually supplied via the manual introduction portion 7.

In the embodiment, a width of the paper sheet which can be transported through the paper transporting path R1 and the reversing and transporting path R2 has the maximum width (width of a direction perpendicular to a transporting direction) of an A4-sized paper sheet by considering a longitudinal direction of the A4-sized paper sheet as the transporting direction. In addition, a width of the paper sheet which can be transported through the manual feeding supplying path R3 has the maximum width (width of the direction perpendicular to the transporting direction) of an A3-sized paper sheet by considering a longitudinal direction of the A3-sized paper sheet as the transporting direction.

Furthermore, the ejected paper receiving tray 8 is formed by adjusting the width of the above-described A4-sized paper sheet. In other words, the width of the ejected paper receiving tray 8 is narrower than a width of the manual feeding supply port 6a.

2. Configuration of Scanner Unit 3

Next, a configuration of the scanner unit 3 will be described. The scanner unit 3 has a document table 30 and the cover 4. The cover 4 is connected to be rotatable via a hinge 29 to an end portion of a −y direction side of the scanner unit 3. For this reason, in the embodiment, the cover 4 considers the end portion of a +y direction side in a closed state as a free end, and by rotating the end portion of the −y direction side as a base end, accordingly, the document table 30 (document reading area 30a) is opened and closed.

An upper surface of the document table 30 forms a mounting surface which mounts the document, and the document table 30 is formed by a transparent glass. In the circumference of the upper surface of the document table 30, a trim-shaped frame 31 is provided. A rectangular area defined by the frame 31 is formed as a document reading area (hereinafter, illustrated with a reference numeral 30a). The document reading area 30a is one stage lower than the upper surface of the frame 31 as a frame body (refer to FIG. 9).

In the embodiment, the document reading area 30a is an area in which the reading is possible by a reading unit 32 which will be described later. However, the size (area surrounded by the frame 31) of the document table 30 and the size of the document reading area 30a are substantially the same in the embodiment.

In the embodiment, the document reading area 30a is positioned at a center portion of the printer 1 in the apparatus width direction (x direction).

Furthermore, on a side facing the document reading area 30a in the cover 4, a document pressing mat 4b formed of an elastic material (for example, a sponge) is provided. For this reason, the document mounted on the document reading area 30a is pressed by the document pressing mat 4b provided in the cover 4, and the reading surface adheres to the document table 30. Therefore, the document pressing mat 4b is formed at substantially the same size as the size of the document reading area 30a.

Here, in the embodiment, with respect to the document reading area 30a, a side (y − side) on which the hinge 29 of the cover 4 is provided is an apparatus rear surface side, and a side (y + side) opposite to the side on which the hinge 29 of the cover 4 is provided by interposing the document reading area 30a in the apparatus front surface side.

As illustrated in FIG. 9, at the corner of the apparatus front surface side in the document reading area 30a, a reading reference position S is set. More specifically, at the corner of a front right side when viewed from the apparatus front surface side, the reading reference position S is set.

The reading reference position S is a position which adjusts the corner of the document. The scanner unit 3 recognizes the reading reference position S as the corner of the document and performs the reading. In the vicinity of the reading reference position S, an arrow-shaped reference position mark 33 is provided. By the reference position mark 33, the user can recognize that the front right corner when viewed from the apparatus front surface side is the reading reference position.

Next, in the embodiment, the scanner unit 3 is a flatbed-shaped scanner. As illustrated in FIG. 9, the reading unit 32 which is movable with respect to the document reading area 30a is provided on a lower side of the document table 30. The reading unit 32 is provided to be moved along the x direction in the embodiment.

The reading unit 32 irradiates the document mounted on the document table 30 with light, is configured as an optical unit which reads information of the document by receiving reflected light from the document, and is configured as the optical unit of a charge coupled devices (CCD) method or a contact image sensor (CIS) method.

Here, the scanner unit 3 and the recording portion 2 are controlled by a control portion 27 (FIG. 11). In addition, the control portion 27 receives various operation signals from the operation portion 5a of the tilt panel 5, sends the signals to the display portion 5b, and performs various types of displays on the display portion 5b. Furthermore, the control portion 27 sends and receives the signal back and forth between the control portion 27 and a printer driver 101 as a "scanner control program" which is operated by an outer computer (PC) 100 connected to the printer 1. There is a case where the outer PC 100 is connected to the printer 1, and there is also a case where the outer PC 100 is not connected to the printer 1.

The image information read by the scanner unit 3 is processed in the control portion 27, and based on the processed information, the control portion 27 controls the recording portion 2 and performs the ink jet recording. When the outer PC 100 is connected, the image information read by the scanner unit 3 is processed in the printer driver 101, and the control portion 27 receives the processed information. Based on the information received from the printer driver 101 by the control portion 27, the recording portion 2 is controlled and the ink jet recording is performed.

Furthermore, similarly to the division reading mode which will be described later, software which is operated by the control portion 27 is executed, or the printer driver 101 which is operated by the outer PC 100 is executed.

Here, in the printer 1 according to the embodiment, the maximum recordable size (for example, A3 size) of the paper sheet in the recording portion 2 is set to be greater than the size (for example, A4 size) of the document reading area 30a. Hereinafter, a document of which the size is greater than the size of the document reading area 30a is referred to as a document MS, and is illustrated in the drawings. The control portion 27 reads the entire document MS by the division reading mode (a plurality of times of the document reading operation) which will be described later, and generates the image information of the entire document MS by linking the read image information.

Based on the obtained image information of the entire document MS, according to circumstances, the ink jet recording is performed with respect to the recording paper sheet of which the size is greater than the size of the document reading area 30a. For example, when the document MS has the A3 size, the document MS is divided and read, the image information of the entire document MS is generated by linking the read image information, and the ink jet recording is performed at the same size as the A3-sized recording paper sheet.

Next, as apparently illustrated in FIG. 4, in the apparatus width direction (x direction) which is a direction perpendicular to a direction (y direction) that brings the document reading area 30a into contact with the cover 4, the hinges 29 which form the rotating shaft of the cover 4 are provided on both sides, that is, the outer sides of the document reading area 30a. On a base end side of the cover 4, a notch 4a is formed between the hinges 29 provided on both sides of the document reading area 30a.

The notch 4a has a function to avoid the manual feeding cover 6 as an "opening/closing body" which is in a closed state at the time of the rotation, and further achieves a function to form the gap 35 between the notch 4a and the manual feeding cover 6 which is in a closed state. The gap 35 will be described later in detail. As the notch 4a which avoids the manual feeding cover 6 forms the gap 35 in this manner, the gap 35 can be configured at a low cost.

Next, the gap 35 is formed both in an opened state and a closed state of the cover 4. Accordingly, as illustrated in FIGS. 5 and 10, the document MS which is pushed out from the document reading area 30a and of which the size is greater than the size of the document reading area 30a, can pass to the outer side of the scanner unit 3 via the gap 35. The reference numeral MT in FIG. 10 illustrates a part which is passed to the outer side of the scanner unit 3 in the document MS. Therefore, it is possible to avoid an inconvenient task, such as folding the document MS when the document MS of which the size is greater than that of the document reading area 30a is read, or rotating the document MS at the time of the division reading, and the operability is improved.

In addition, in the embodiment, since the gap 35 is formed both in the opened state and the closed state of the cover 4, it is possible to obtain an excellent reading result by suppressing the light incorporated from the outside by closing the cover 4 at the time of the reading. However, the configuration is not limited thereto, and the gap 35 may be formed only in the opened state of the cover 4.

In addition, in the embodiment, the gap 35 is formed to include the entire document reading area 30a in the x direction as apparently illustrated in FIGS. 4 and 9. Therefore, more sizes of the document can pass the part pushed out from the document reading area 30a to the outer side of the scanner unit 3. However, the configuration is not limited thereto. The gap 35 may be formed to include at least a part of the document reading area 30a, and at least one size of the document may be able to pass the part pushed out from the document reading area 30a to the outer side of the scanner unit 3.

Furthermore, in FIG. 9, the gap 35 is illustrated as a dashed line for convenience.

In addition, in the embodiment, the gap 35 is formed between the hinges 29 provided on both sides of the document reading area 30a, but the configuration is not necessarily limited thereto. For example, the hinge 29 may be formed within the range of the document reading area 30a in the x direction. In other words, the gap 35 which passes the document may be formed in the cover 4 or between the main body of the scanner unit 3 and the cover 4.

In addition, in the embodiment, the manual feeding cover 6 supports the document MS pushed out from the document reading area 30a. In particular, in the embodiment, a supporting position (upper surface of the manual feeding cover 6 in a closed state) where the manual feeding cover 6 supports the document MS is higher than the document table 30 (FIG. 10). Therefore, it is possible to support the document MS at a higher position, and to suppress the slipping or the drooping of the document from the document table 30. However, the embodiment is not limited thereto, and the manual feeding cover 6 may be configured not to support the document MS.

In addition, in the embodiment, the tilt panel 5 which constitutes the scanner unit 3 and the operation portion of the recording portion 2 supports the document MS pushed out from the document reading area 30a (FIGS. 10, 12B, and 12C). Accordingly, it is possible to obtain an effect to more effectively suppress the drooping or the slipping of the document MS from the document table 30. Furthermore, the tilt panel 5 may be configured not to be tiltable and to be fixed at a predetermined angle, and the panel may be configured to be able to support the document MS. The tilt panel 5 may be configured not to support the document MS.

In addition, in the embodiment, the supporting position where the tilt panel 5 supports the document MS is higher than the document table 30 (FIG. 10). Accordingly, it is possible to suppress the slipping or the drooping of the document MS from the document table 30 with certainty.

Furthermore, the tilt panel 5 is configured to be tiltable. In the most opened state, an upper surface (reference numeral 5c in FIG. 10) of the tilt panel 5 is configured to be a substantially horizontal surface. In other words, the supporting surface which supports the document MS can be the substantially horizontal surface. Accordingly, it is possible to more effectively suppress the slipping and the drooping of the document MS from the document table 30.

However, even when the panel surface of the tilt panel 5 is configured not to form a horizontal surface, that is, even when the panel surface at the most open angle is configured to be a downward inclined surface to some extent, a configuration in which the document MS can be supported may be adopted.

In addition, in the embodiment, in the apparatus width direction (x direction) which is the direction perpendicular to the direction (y direction) that brings the document reading area 30*a* into contact with the cover 4, the tilt panel 5 is formed at a width which includes the entire document reading area 30*a*. Accordingly, the entire width direction of the document MS pushed out from the document reading area 30*a* is supported by the tilt panel 5, and the slipping or the drooping of the document MS from the document table 30 is more effectively suppressed.

However, the embodiment is not limited thereto, and the tilt panel 5 may be formed at a width which includes at least a part of the document reading area 30*a*.

Furthermore, in another embodiment, it is possible to use a driving source 37 illustrated with the reference numeral 37 in FIG. 11. The driving source 37 is a driving source (for example, a motor) which makes the tilt panel 5 tilted, and under control of the control portion 27, sets the tilt panel 5 at a predetermined angle of inclination (posture). At the time of the document reading by the scanner unit 3, the control portion 27 controls a supporting surface 5*c* which supports the document in the tilt panel 5 to be the substantially horizontal surface. Accordingly, by an operation of the user, it is possible to more effectively suppress the slipping or the drooping of the document from the document table 30. However, the tilt panel 5 may be configured to be tilted by the operation of the user without being driven by the driving source. The tilt panel 5 may also be configured to be driven by the driving source only in an opening direction, and a closing direction may be configured by the operation of the user.

3. Division Reading Mode

Next, the division reading mode will be described. The control portion 27, as already described, reads the entire document MS of which the size is greater than that of the document reading area 30*a* by the division reading mode (the plurality of times of the document reading operation), and generates the image information of the entire document MS by linking the read image information. Based on the obtained image information of the entire document MS, according to circumstances, the ink jet recording is performed with respect to the recording paper sheet of which the size is greater than the size of the document reading area 30*a*.

FIGS. 12 to 16 illustrate an example in which the A3-sized document MS is divided and read as an example, the image information of the entire document MS is generated by linking the read image information, and the ink jet recording is performed at the same size as the A3-sized recording paper sheet.

First, the reading reference position S in the document reading area 30*a* is provided at the corner of a side far from the hinge 29 which constitutes the rotating shaft of the cover 4 in the embodiment (FIGS. 3 and 9). Accordingly, when the division reading mode is executed, the document MS slides in the direction away from the hinge 29 (in the order of FIGS. 12A, 12B, and 12C). Accordingly, the operability is improved when the document MS slides.

More specifically, by the document reading area 30*a* at the A4 size, the division reading of the A3-sized document MS is performed by the total of three times of the reading operation.

At the time of a first reading operation, the document MS adjusts the corner (a corner (reference numeral T in FIG. 13) which is an upper right corner of the document when the reading surface is shown as a front surface) of the document MS to the reading reference position S, as illustrated in FIG. 12A. At this time, the document MS is in a state where the part pushed out from the document reading area 30*a* as described above is out to the outer side of the scanner unit 3 via the gap 35.

Before the first reading operation, when the user selects the division reading mode, the control portion 27 displays information (guidance) which introduces a mounting method of the document MS on the display portion 5*b*, for example. FIG. 14 is an example of the guidance information, and corresponds to FIG. 12A. Accordingly, the operation method is apparent from the user's side, and it is possible to prevent the document MS from inappropriately being set.

When the document MS is set and the user pushes the scan button, the control portion 27 performs the first reading operation. The first document reading operation in the division reading mode is initiated from the reading reference position S side. Furthermore, the scan button here is one operation button which is assigned to the operation portion 5*a* when the printer 1 is used in a stand-alone state, or a touch panel button (GUI) which is displayed on the display portion 5*b*. When the outer PC 100 (FIG. 11) is connected to the printer 1, the scan button is a button (GUI) displayed on the display by the printer driver 101.

An area SC1 in FIG. 13 illustrates an area read by the first reading operation.

When the first reading operation ends, the control portion 27 displays the information (guidance) which introduces a second mounting method of the document MS in the display portion 5*b*. FIG. 15 is an example of the guidance information, and corresponds to FIG. 12B. In particular, the user slides a predetermined amount of the documents MS to the apparatus front side (lower side in FIG. 12). As the user pushes the scan button, the control portion 27 performs a second reading operation.

In FIG. 13, an area SC2 illustrates an area read by the second reading operation.

When the second reading operation ends, the control portion 27 displays the information (guidance) which introduces a third mounting method of the document MS in the display portion 5*b*. FIG. 16 is an example of the guidance information, and corresponds to FIG. 12C. In particular, the user slides the predetermined amount of the documents MS to the apparatus front side (lower side in FIG. 12). As the user pushes the scan button, the control portion 27 performs a third reading operation.

In FIG. 13, an area SC3 illustrates an area read by the third reading operation.

When the image information of the entire document MS by linking each image (three images in the above-described embodiment) is obtained as described above, the control portion 27 obtains the image information by sequentially linking a predetermined image position on a reading ending position side of the image obtained by the first document reading operation in a direction (y direction: vertical direction in FIG. 13) which links the images, and a predetermined image position on a reading initiating position side of the image obtained by the following document reading operation.

For example, a position ST1 in FIG. 13 is a position which links the predetermined image position on the reading ending position side of the image obtained by the first document reading operation (SC1) in a direction that links the images, and the predetermined image position on the reading initiating position side of the image obtained by the second document reading operation (SC2). Similarly, a position ST2 in FIG. 13 is a position which links the predetermined image position on the reading ending position side of the image obtained by the second document reading operation (SC2), and the predetermined image position on the reading initiating position side of the image obtained by the third document reading operation (SC3). Furthermore, the arrow E in FIG. 13 illustrates the slide direction of the document MS in dividing and reading.

In other words, since the document MS slides in one predetermined direction and can be sequentially read, the document MS is not required to be rotated, and the operability is improved when the reading operation of the document of which the size is greater than that of the document reading area 30a is performed.

For example, when the size of the image of the entire document MS obtained by the above-described division reading mode is substantially the same size as the paper sheet of the maximum recordable size in the recording portion 2, the control portion 27 can execute the recording mode which records the obtained image information of the entire document MS with respect to the paper sheet of the maximum size without enlargement or reduction. For example, in the above-described example, the size of the image of the entire document MS is the A3 size, and the recording is possible with respect to the A3-sized paper sheet without enlargement or reduction by the recording portion 2. In other words, it is possible to perform copying at the same size as the original document, and the convenience is improved.

In the embodiment described above, an example in which the document MS is the A3 size, and the read information on the entire document is recorded at the same size as the A3-sized paper sheet in the recording portion 2, is described. However, there are various combinations of the document size, the number of division (entire scan number) when the division reading mode is performed, the size of the recording paper sheet when the recording is performed, and an output magnification (enlarging/reducing magnification) at the time of the recording, and needless to say the invention is not limited to the above-described embodiment.

Furthermore, the linking of the above-described images is described as the linking performed by the control portion 27 which is provided with the printers 1. However, when the outer PC 100 (FIG. 11) is connected to the printers 1, the linking is performed by the printer driver 101 which is operated by the outer PC 100. In addition, similarly, the guidance display illustrated in FIGS. 14 to 16 is displayed on the display (not illustrated) in the outer PC 100.

In addition, in the embodiment described above, an example, in which the reading reference position S is configured to be at the apparatus front side in the document reading area 30a, and the document MS slides to the apparatus front side at the time of the division reading, is described. However, the invention is not limited thereto, and for example, the reading reference position S may be in the inside of the apparatus in the document reading area 30a, and the document MS may slide to the inside of the apparatus at the time of the division reading.

It is also appropriate that a guide 39 illustrated in FIG. 17 is provided as another embodiment of the scanner unit 3. The guide 39 in FIG. 17 is integrally formed with the frame 31 to be protruded from the upper surface of the frame 31 in the height direction which forms the vicinity of the document reading area 30a, and is formed to be extended along the y direction, that is, the slide direction of the document MS. In the example of FIG. 17, the guides 39 are the outer sides of the document reading area 30a, and are provided on both sides of the document reading area 30a in the y direction.

The guide 39 functions to guide an edge (edge on a right side in FIG. 17) of the document MS when the document MS slides. Accordingly, when the document MS of which the size is greater than that of the document reading area 30a is divided and read (when the document MS slides), it is possible to suppress the deviation or the oblique motion of the document MS, and an excellent reading result can be obtained.

The entire disclosure of Japanese Patent Application No. 2013-191919 filed on Sep. 17, 2013 and No. 2013-191946 filed on Sep. 17, 2013 are expressly incorporated by reference herein.

What is claimed is:

1. A recording apparatus, comprising:
 a scanner portion which reads a document mounted on a document table formed by a transparent glass; and
 a recording portion which records information read by the scanner portion to a medium, the recording portion including a medium supply port which supplies the medium,
 wherein, in the recording portion, a maximum recordable size of the medium is greater than the size of a document table which reads the document,
 wherein the scanner portion includes:
  a cover which opens and closes the document table; and
  hinge portions on which the cover rotates,
 wherein the hinge portions, in a direction perpendicular to a direction in which the document table is brought into contact with the cover, are disposed on outer sides of the document table, and are provided on both sides of the document table, and
 wherein, at a base end side of the cover, is provided a gap, through which the document passes and is pushed out from the document table to an outer side of the scanner portion, that includes an upper area of the medium supply port, the document having a size greater than the size of the document table, a base end of the gap being disposed above both the document table and a frame surrounding the document table, and the gap is formed in a state where the cover is opened.

2. The recording apparatus according to claim 1, wherein the gap is formed in a state where the cover is closed.

3. The recording apparatus according to claim 1, wherein, in a direction perpendicular to a direction in which the document table is brought into contact with the gap, the gap is formed so as to include an entire document table.

4. The recording apparatus according to claim 1, wherein the medium supply port is positioned between the document table and the gap for supplying the recording medium into the recording portion.

5. The recording apparatus according to claim 4, wherein a supporting position at which the opening/closing body supports the document is higher than the document table.

6. The recording apparatus according to claim 4, wherein the cover has a notch which avoids the opening/closing body in a closed state at the time of the rotation, and wherein, when the cover is opened and the opening/closing body is closed, the gap is formed between the notch and the opening/closing body.

7. The recording apparatus according to claim 1, further comprising:
 a panel, which constitutes the scanner portion and an operation portion of the recording portion at a side opposite to a side where the gap is provided by interposing the document table, and wherein the panel supports the document which is pushed out from the document table.

8. The recording apparatus according to claim 7, wherein a supporting position at which the panel supports the document is higher than the document table.

9. The recording apparatus according to claim 7, wherein the supporting surface which supports the document is a substantially horizontal surface in the panel.

10. The recording apparatus according to claim 1, wherein a guide portion, which guides an edge of the document when the document slides along a direction that brings the document table into contact with the gap, is provided at an outer side of the document reading area.

11. The recording apparatus according to claim 1, wherein, a control portion controls the scanner portion, and wherein, with respect to a document of which a size is greater than the size of the document table, a division reading mode is executed in which image information of the entire document is obtained by linking image information obtained via a plurality of times of a document reading operation.

12. A recording apparatus, comprising:
a scanner portion which reads a document mounted on a document table formed by a transparent glass;
a recording portion which records information read by the scanner portion to a medium, the recording portion including a medium support which supplies the medium; and
a panel which constitutes the scanner portion and an operation portion of the recording portion,
wherein a gap is provided at a base end side of the scanner portion through which the document passes and is pushed out from the document table to an outer side of the scanner portion and includes an upper area of the medium supply portion, a base end of the gap being disposed above both the document table and a frame surrounding the document table, and the gap is formed in a state where the scanner portion is opened,
wherein, in the recording portion, the maximum recordable size of the medium is greater than the size of a document table which reads the document, and wherein the panel supports the document pushed out from the document table.

13. The recording apparatus according to claim 12, wherein a supporting position at which the panel supports the document is higher than the document table.

14. The recording apparatus according to claim 12, wherein the panel is provided to be tiltable.

15. The recording apparatus according to claim 14, wherein a supporting surface, which supports the document in the panel in a state where the panel is opened, is a substantially horizontal surface.

16. The recording apparatus according to claim 14, further comprising:
a driving source which tilts the panel; and
a control portion which controls a driving source and the scanner portion,
wherein the control portion controls the driving source so that a supporting surface that supports the document on the panel is a substantially horizontal surface at the time of the document reading by the scanner portion.

17. The recording apparatus according to claim 12, wherein the panel is formed at a width including the entire document table, in a direction perpendicular to a direction in which the document table is brought into contact with the panel.

18. The recording apparatus according to claim 12, further comprising:
the medium supply port is provided on a side opposite to a side where the panel is provided by interposing the document table, for supplying the recording medium into the recording portion.

19. The recording apparatus according to claim 18, wherein a supporting position at which the opening/closing body supports the document is higher than the document table.

20. The recording apparatus according to claim 12, wherein a guide portion which guides an edge of the document when the document slides along the direction in which the document table is brought into contact with the panel, is provided at an outer side of the document table.

* * * * *